March 31, 1959 M. B. SWISHER 2,879,859
SELF-PROPELLED RIDING VEHICLE
Filed April 15, 1957 2 Sheets-Sheet 1
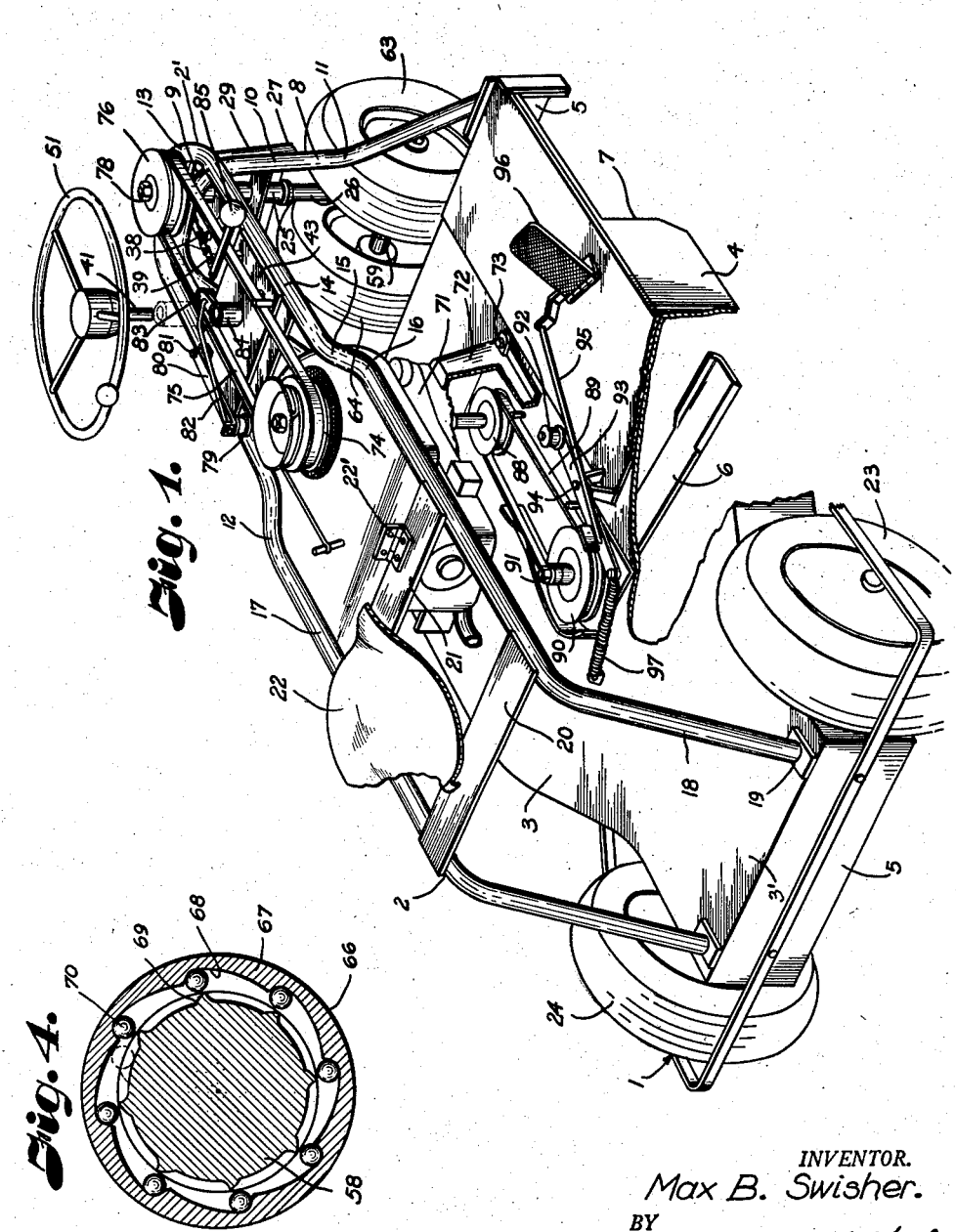
INVENTOR.
Max B. Swisher.
BY
Fishburn and Gold
ATTORNEYS.

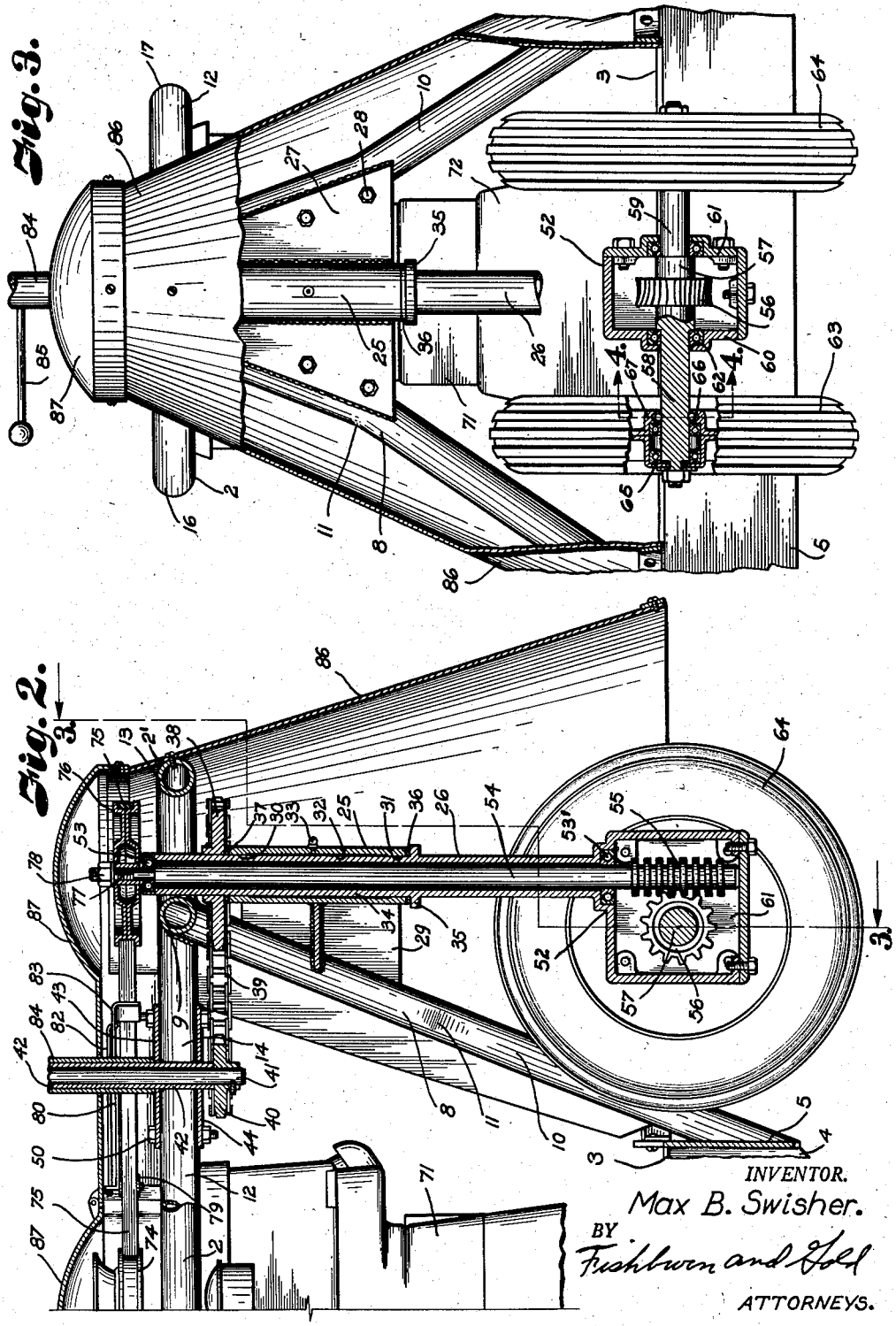

United States Patent Office 2,879,859
Patented Mar. 31, 1959

2,879,859

SELF-PROPELLED RIDING VEHICLE

Max B. Swisher, Warrensburg, Mo.

Application April 15, 1957, Serial No. 652,740

2 Claims. (Cl. 180—26)

This invention relates to self-propelled riding vehicles, and more particularly to a novel combined driving and steering mechanism in a self-propelled vehicle such as a lawn mower or other grounds tending implement.

The principal objects of the present invention are to provide a self-propelled riding vehicle with spaced wheels at one end thereof that are driven and steered for maximum maneuverability of the vehicle; to provide a grounds tending vehicle having at least four wheels, two of which are at one end carried on driven axles extending from a speed reduction unit operatively connected with a prime mover on the vehicle, said speed reduction unit being rotatably mounted on the vehicle for rotation about a vertical axis whereby rotation of the speed reduction unit about said axis and driving of the wheels propels and steers the vehicle forwardly to the right, left or rear; to provide such a grounds tending vehicle with a rotatably mounted cutter blade intermediate the ends of said vehicle for mowing lawns and the like; to provide such a vehicle drive with an overrunning clutch between the driving wheels and axle; to provide a differential action for facilitating steering of the vehicle; and to provide such a grounds tending vehicle that is economical to manufacture, efficient in operation, with a combined driving and steering structure for substantial traction and maneuverability in all directions.

In accomplishing these and other objects of the present invention, I have provided improved details of structure, the preferred form of which is illustrated in the accompanying drawings, wherein:

Fig. 1 is a perspective view of a grounds tending vehicle with portions broken away to illustrate the various portions of the structure thereof.

Fig. 2 is a vertical sectional view through the combined steering and driving mechanism of the vehicle.

Fig. 3 is a vertical sectional view through the vehicle on the line 3—3, Fig. 2.

Fig. 4 is a transverse sectional view through the overrunning clutch connection between a driving wheel and driving axle taken on the line 4—4, Fig. 3.

Referring more in detail to the drawings:

1 designates a grounds tending self-propelled vehicle embodying the features of the invention and illustrated in the form of a lawn mower.

The vehicle includes a unitary chassis frame 2 which includes a platform or floor plate 3 having depending sides 4 and depending ends 5 forming an enclosure for a rotatably mounted cutting blade 6. One of the sides has an opening 7 for discharge of cut grass and the like. The frame 2 includes an A-frame portion 8 adjacent the forward end 2' thereof and preferably constructed of tubular members and arranged to form a top bar 9 terminating on each side in legs 10 which, in the illustrated structure, extend downwardly and outwardly and are further bent outwardly as at 11 with the lower ends suitably secured to the forward end of the platform 3 and the depending end 5 thereon. A top frame member 12 is also preferably primarily formed of tubular material and includes an arcuate forward portion 13 terminating in rearwardly extending side members 14 that are bent outwardly and then inwardly as at 15 and 16 to provide parallel portions 17 extending substantially to the rear of the vehicle where they terminate in downwardly extending spaced legs 18, the lower ends of which are suitably secured as at 19 to the platform 3. The parallel members 17 are connected by suitable transverse bars 20 and 21 and a seat 22 is preferably connected to the bars 21 by hinges 22' to rest on said bars 20 and 21.

The A-frame portion 8 slopes upwardly and forwardly from the front end of the platform 3 and the forward portions of the members 14 are suitably spaced to engage the A-frame portion 8 adjacent the upper end thereof and are suitably secured thereto as by welding or the like to cooperate in forming a forward elevated frame portion. It is to be understood that the frame 2 is subject to variations in shape, structure and material, it being preferable that the frame be lightweight, rigid and strong.

The rear end portion of the platform 3 is preferably of reduced width, as illustrated in Fig. 1, with spaced ground-engaging wheels 23 and 24 rotatably mounted on opposite sides in axial alignment for supporting the rear end 3' of the vehicle. It is also preferable that a suitable brake (not shown) be arranged to engage the rear wheels when it is desired to hold the vehicle stationary or retard movement thereof.

The other or forward end of the frame is provided with a suitable bearing member 25 for rotatably mounting or journalling a tubular steering post 26 on a substantially vertical axis. In the illustrated structure, the bearing member 25 is a hollow sleeve-like member having laterally extending plates 27 secured by suitable fastening devices such as bolts 28 to a bracket 29 fixed on the A-frame 8 and extending forwardly therefrom below the upper end thereof. The bearing member 25 is illustrated as being an elongated sleeve having bearing portions 30 and 31 at the ends thereof with an enlarged bore 32 between the bearing portions for retaining suitable lubricant applied through a lubricating fitting 33 as illustrated in Fig. 2.

The post 26 has a cylindrical upper portion 34 extending through the bearing portions 30 and 31 whereby the post is rotatably mounted therein, said post having an annular collar or flange 35 fixed thereon adjacent the lower end of the bearing member 25 with a suitable washer 36 sleeved on the upper post portion 34 and engaged with the lower end of the bearing member 25 and the upper face of the annular collar or flange 35. A washer 37 is engaged with the upper end of the bearing member 25 between said bearing member and a sprocket 38 suitably fixed to the upper portion 34 of the post 26.

The sprocket 38 is operatively connected by a chain 39 with a sprocket 40 fixed to the lower end of a shaft 41 rotatably mounted in a bearing post 42 supported by transverse plates 43 and 44 that extend transversely of the frame members 14 and are suitably secured thereto with a suitable fastening device such as bolts 50. A steering device such as a wheel 51 is fixed to the shaft 41 whereby rotation of said wheel will turn the sprockets 40 and 38 and rotate the tubular steering post 26.

A speed reduction housing 52 is located at and fixed to the lower end of the post 26 and bearings 53 and 53' are preferably arranged at the upper and lower ends respectively of the post 26 to rotatably mount a shaft 54 therein. The shaft 54 is coaxial with the axis of the bearing portions 30 and 31. The shaft 54 extends into the housing 52, and in the illustrated structure, a worm 55 is fixed on the shaft 54 in the housing 52 in meshing engagement with a worm gear 56 fixed on a shaft 57 having end portions or axles 58 and 59 extending from the sides 60 and 61 of the housing 52, suitable bearings 62 being arranged in said sides to rotatably mount the shaft 57.

Ground-engaging wheels 63 and 64 are rotatably mounted on the ends of the shaft portions 58 and 59 respectively by means of suitable bearings 65 as illustrated in Fig. 3. Overrunning clutches 66 provide operative engagement between the shafts 58 and 59 and the wheels 63 and 64 respectively, said overrunning clutches being arranged to drive the wheels when the shaft 57 is rotated in a clockwise direction, Fig. 2. A form of overrunning clutch is illustrated in Fig. 4 wherein the wheel hub 67 has cam surfaces 68 which cooperate with cam surfaces 69 on the respective shafts 58 and 59 whereby balls 70 move inwardly on the cam surfaces 68 and engage the lugs 69 when the shaft is rotated in a clockwise direction, Fig. 4, and the hub 67 is retarded to make the driving connection. If the hub 67 is rotated in a clockwise direction faster than the rotation of the shaft, Fig. 4, the balls 70 move out of engagement with the shaft to provide a free-running action.

Power is supplied for driving the traction wheels 63 and 64 by a suitable engine 71 mounted on the frame and preferably toward the forward portion thereof whereby the weight of the engine adds to the traction of the wheels 63 and 64. The engine 71 is preferably of the vertical crankshaft type and is mounted on a suitable bracket 72 fixed to the platform 3 by suitable fastening devices 73. In the illustrated structure, the upper portion of the crankshaft has a pulley 74 fixed thereon and operatively connected by a belt 75 to a pulley 76 that is secured to a threaded extension 77 of the upper end of the shaft 54, the pulley 76 being suitably keyed or otherwise fixed to the shaft portion 77 and held in place by a nut or the like 78. The belt 75 is preferably loose and driving engagement is effected by means of a roller 79 on an arm 80 swingably mounted as at 81 on the plate 43. The arm 80 is connected by a link 82 to an arm 83 carried by a sleeve 84 rotatably mounted on the bearing member 42 and operated by a lever 85 to swing the roller 79 into engagement with the belt 75 to tighten same relative to the pulleys 74 and 76 to effect a driving engagement whereby the operation of the engine 71 rotates the shaft 54 and through the speed reduction in the housing 52 rotates the shaft portions 58 and 59 to drive the wheels 63 and 64 through the overrunning clutches 66.

The drive of the shaft 54 from the engine 71 is such that the shaft is rotated at relatively high speed, for example, at substantially the same speed or r.p.m. as the engine. This high speed with relatively low torque of shaft 54 is converted by the speed reduction gearing in the housing 52 to low speed high torque in the shaft 57 and wheels 63 and 64. This arrangement provides only a low torque transmitted from the shaft 54 to the steering post 26 whereby the drive does not interfere with turning the steering post 26 in steering the vehicle. Therefore, the gear reduction being located on the steering post and the shaft 54 being driven at high speed eliminates steering resistance that is present in drives wherein the gear reduction is between the engine and shaft 54 for driving the shaft 54 at low speeds and high torque.

In the illustrated structure, a cowling 86 is fixed to the frame 2 at the forward end thereof and a cover 87 is arranged over the pulley 74, belt 75 and pulley 76 to enhance the appearance of the structure and also to eliminate possibility of the operator becoming entangled or injured by engagement with any of the operating portions thereof. Also, in the illustrated structure, when the vehicle is to be used as a lawn mower, the lower end of the engine crankshaft is provided with a pulley 88 operatively connected by a belt 89 with a pulley 90 fixed to a shaft 91 that extends through the platform 3 and carries the cutter blade 6. The belt 89 is preferably a loose type and driving engagement for the blade is effected by the roller 92 adapted to engage the belt and carried on an arm 93 pivotally mounted at 94 on the platform 3 and connected by a link 95 with a pedal 96. A spring 97 normally holds the roller 92 out of engagement with the belt 89 whereby the cutter blade will remain idle. The operator holding his foot on the pedal 96 will effect engagement of the roller 92 with the belt 89 whereby the drive from the engine 71 through the pulleys 88, belt 89 and pulley 90 will drive the cutter blade 6 to cut grass or the like. While the vehicle may be used as a lawn mower, it is to be understood that it also may be used as a riding grounds tending vehicle adapted for modifications for various ground tending operations.

In operating a grounds tending vehicle constructed and assembled as described, the engine is started, and then by moving the lever 85 to swing the arm 80 to engage the roller 79 with the belt 75 to tighten same relative to the pulleys 74 and 76, the engine will drive through the belt and said pulleys to rotate the shaft 54, and through the worm gearing in the housing 52 drive the shafts or axles 58 and 59 which, through the overrunning clutches 66, drive the wheels 63 and 64 to move the vehicle forwardly when positioned as illustrated in Figs. 1 and 2. By rotating the wheel 51, the sprocket 40 is rotated, and through the chain 39 turns the sprocket 38 and post 26 to rotate or swing the housing 52 and axles 58 and 59 about the vertical axis of the bearing member 25 to steer the vehicle. The post 26 may be turned through a complete 360 degrees, and if the vehicle is moving forwardly, and the post is turned through 90 degrees, the vehicle will turn around in a circle that has a radius of approximately equal to the wheel base of the vehicle. Turning the steering post 180 degrees from its position when going in a forward direction will cause the vehicle to be driven in a rearward direction. During the time the vehicle is moving in a circle, the inner of the driving wheels 63 and 64 will be driven and the outer wheel will overrun due to the overrunning clutch 66 therein. This provides a structure having four wheels for good stability, permits turning with a differential action between the driving wheels to eliminate possibility of damage to the terrain and also provides a maneuverability whereby the vehicle may be operated around and in and out of shrubbery to cover substantially every portion of grounds over which it is operated.

If it is desired to mow the area being traversed, the operator's foot is placed on the pedal to engage the drive to the cutting blade 6 rotating same to cut grass and the like over the area traversed by the mower or vehicle.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A grounds tending vehicle comprising, a unitary chassis frame having a floor plate intermediate its front and rear ends, a prime mover mounted on the frame above the floor plate, a pair of ground-engaging wheels arranged in spaced relation and positioned adjacent to and supporting the rear end of the chassis frame, said wheels being rotatable about an axis disposed in fixed relation to said chassis frame, said chassis frame having a forwardly extending elevated portion, a pair of traction wheels arranged in spaced relation under said forward elevated portion of the chassis frame and supporting the front end of said frame, a steering post journalled on the forward elevated frame portion for rotation about a substantially vertical axis, a housing fixed on the lower portion of said steering post, driven axles extending outwardly in opposite directions from said housing and rotatably mounted therein with the axis of said driven axles being spaced rearwardly of the axis of the steering post relative to the direction the vehicle is propelled, means rotatably mounting the traction wheels on said driven axles, overrunning clutch means operatively connecting the wheels to the driven axles for rotation therewith in one direction, said steering post being hollow, a drive shaft rotatably mounted in the steering post and extending therethrough into the housing, a worm gear in the housing and fixed to the driven axles, a worm on the drive shaft in the housing and meshing with the worm gear on the driven axles for imparting to said driven axles low speed high torque rotation in response to high speed low torque rotation of the drive shaft, a drive pulley above the prime mover and operatively connected therewith, a driven pulley fixed on the upper end of the drive shaft, an endless belt loosely trained about said drive and driven pulleys, means swingably mounted on the frame to move toward and away from said belt and operative to engage and press the belt to tighten same on the drive and driven pulleys to rotate the drive shaft and transmit power to the traction wheels, a steering wheel journalled on the frame in spaced relation to the steering post, and means operataively connecting the steering wheel to the steering post for selectively rotating said post to swing the traction wheels for steering the vehicle and selecting the direction of travel from forward to rearwardly thereof.

2. A ground tending vehicle comprising, a unitary chassis frame having a floor plate intermediate its front and rear ends, a prime mover mounted on the frame above the floor plate, a pair of ground-engaging wheels arranged in spaced relation and positioned adjacent to and supporting the rear end of the chassis frame, said wheels being rotatable about an axis disposed in fixed relation to said chassis frame, said chassis frame having a forwardly extending elevated portion, a pair of traction wheels arranged in spaced relation under said forward elevated portion of the chassis frame and supporting the front end of said frame, a steering post journalled on the forward elevated frame portion for rotation about a substantially vertical axis, a housing fixed on the lower portion of said steering post, driven axles extending outwardly in opposite directions from said housing and rotatably mounted therein with the axis of said driven axles spaced rearwardly from the axis of the steering post relative to the direction the vehicle is propelled, means rotatably mounting the traction wheels on said driven axles, overrunning clutch means operatively connecting the wheels to the driven axles for rotation therewith in one direction, said steering post being hollow, a drive shaft rotatably mounted in the steering post and extending therethrough into the housing, a worm gear in the housing fixed to the driven axles, a worm fixed on the drive shaft portion in the housing and meshing with said worm gear for rotating said driven axles at a relatively low speed in response to high speed rotation of the drive shaft, means operatively connecting the prime mover with the drive shaft for rotating same to drive the traction wheels, and means operatively connected with the steering post for turning same to swing the housing and traction wheels for steering the vehicle and changing the direction of travel from forward to rearward.

References Cited in the file of this patent

UNITED STATES PATENTS

| | | |
|---|---|---|
| 1,141,839 | Settergren | June 1, 1915 |
| 1,221,334 | King | Apr. 3, 1917 |
| 1,438,051 | Moakler | Dec. 5, 1922 |
| 1,560,042 | Davison | Nov. 3, 1925 |
| 1,833,844 | Lusse | Nov. 24, 1931 |
| 2,582,177 | Swisher et al. | Jan. 8, 1952 |
| 2,620,612 | De Eugenio | Dec. 9, 1952 |
| 2,659,445 | Church | Nov. 17, 1953 |
| 2,674,837 | Buck | Apr. 13, 1954 |
| 2,705,393 | Cofer | Apr. 5, 1955 |
| 2,764,268 | Summerour | Sept. 25, 1956 |
| 2,765,861 | Ekas | Oct. 9, 1956 |